United States Patent [19]
Mihalich et al.

[11] Patent Number: 5,295,779
[45] Date of Patent: Mar. 22, 1994

[54] FLEXIBLE MATERIAL VEHICLE UNLOADER

[76] Inventors: Robert M. Mihalich; George M. Mihalich, both of 3944 Cameron Ave., Hammond, Ind. 46327

[21] Appl. No.: 899,624
[22] Filed: Jun. 16, 1992
[51] Int. Cl.⁵ .............................. B65G 67/24
[52] U.S. Cl. .................... 414/395; 414/402; 414/786
[58] Field of Search ........... 414/390, 395, 527, 509, 414/510, 507, 402, 400, 539, 786, 376, 393

[56] References Cited

U.S. PATENT DOCUMENTS

| | | | |
|---|---|---|---|
| 223,082 | 12/1879 | Tyler | 414/393 |
| 683,043 | 9/1901 | Haynes | 414/393 |
| 1,099,555 | 6/1914 | Lawrence | 414/393 X |
| 1,207,795 | 12/1916 | Riekenberg | 414/393 |
| 1,329,392 | 2/1920 | Ford | 414/393 X |
| 1,578,431 | 3/1926 | Haman | 414/393 |
| 2,407,430 | 9/1946 | MacRae | 414/393 X |
| 2,662,650 | 12/1953 | Russell | 414/539 |
| 2,923,423 | 2/1960 | Maney | 414/402 X |
| 4,601,631 | 7/1986 | Van Raaij | 414/539 X |
| 5,156,518 | 10/1992 | VanMatre | 414/527 |

Primary Examiner—David A. Bucci
Attorney, Agent, or Firm—Patula & Associates

[57] ABSTRACT

A dual tarpaulin unloading system which rests in the bed of a vehicle. The second end of the first tarpaulin is attached to the bed of the vehicle by a single mechanical arrangement which allows the unloading system to detach after the unloading cycle is complete. The payload to be transported and unloaded rests on the upper surface of the second tarpaulin. At the dumping site, the vehicle door bed is opened and the first end of the first tarpaulin and the first end of the second tarpaulin are attached to a drawing strap. The opposite end of the drawing strap is attached to established anchorage. The vehicle then moves in a direction away from the established anchorage. The weight of the payload on the first and second tarpaulin coupled with the movement of the vehicle forces the payload off the vehicle bed and onto the ground.

23 Claims, 6 Drawing Sheets

FIG.1

FLEXIBLE MATERIAL VEHICLE UNLOADER

FIELD OF THE INVENTION

This invention relates to an apparatus for unloading a payload from the bed of a vehicle.

BACKGROUND OF THE INVENTION

While many inventions exist which teach devices for unloading a vehicle, most are cumbersome to use and require complicated mechanical equipment or extensive modifications to the vehicle bed. In addition to being expensive, the modifications often prevent the vehicle from readily being used for other types of hauling. The present invention solves these problems by teaching a simple, inexpensive, easy to manufacture, easy to install and operate unloading system that can be placed in the bed of virtually any type of vehicle that can carry a payload.

Other types of vehicle unloaders have been developed, but none offer the unique features of the present invention. For example, U.S. Pat. No. 2,876,917 to King, U.S. Pat. No. 3,443,703 to Matsumoto, U.S. Pat. No. 3,978,996 to Oltrogge, U.S. Pat. No. 4,601,631 to Van Raaij, U.S. Pat. No. 4,629,390 to Burke, all teach various methods of unloading a vehicle, but rely on complicated mechanical apparatus or major modifications to the vehicle to effectuate the unloading, which the present invention renders unnecessary.

U.S. Pat. No. 3,035,724 to Clark teaches an ejector for loader buckets, but Clark cannot be adapted for use with vehicles that are not power loaders. On the other hand, the present invention can be used on a wide variety of vehicle beds.

U.S. Pat. No. 3,870,367 to O'Brien teaches a wheelbarrow like vehicle for transporting bulky material such as leaves, trash or the like, but requires human strength to dump the load, whereas the present invention relies on mechanical power provided by a vehicle or winch to dump the load.

U.S. Pat. No. 4,034,880 to Frenette teaches an instant load release system, but differs from the present invention because Frenette operates only on a vehicle that has a tilt bed, whereas the present invention does not require a vehicle with a tilt bed to effectuate unloading.

U.S. Pat. No. 4,314,788 to Williams teaches a crop handling apparatus, but differs from the present invention because Williams relies on a spring-loaded roller to effectuate unloading, whereas the present invention relies on mechanical power provided by a vehicle or winch to dump the load.

BRIEF SUMMARY OF THE INVENTION

The preferred embodiment of the invention consists of a dual tarpaulin unloading system which rests in the bed of a vehicle. The second end of the first tarpaulin is attached to the bed of the vehicle by a single mechanical arrangement which allows the invention to detach after the unloading cycle is complete. The payload to be transported and unloaded rests on the upper surface of the second tarpaulin. At the dumping site, the vehicle door bed is opened and the first end of the first tarpaulin and the first end of the second tarpaulin are attached to a drawing strap. The opposite end of the drawing strap is attached to established anchorage. The vehicle then moves in a direction away from the established anchorage. The weight of the payload on the first and second tarpaulin coupled with the movement of the vehicle forces the payload off the vehicle bed and onto the ground.

It is the principle object of the invention to provide a simple, inexpensive method of dumping a payload from a vehicle.

It is another object of the invention to provide a dumping system that can easily be operated by one person.

It is also an object of the present invention to provide an unloading system that does not require major, permanent modification to the vehicle or vehicle bed.

Moreover, it is an object of the invention to provide an unloading system that does not alter the vehicle bed so as to preclude the vehicle bed from other uses.

Further, it is an object of the invention to provide an unloading system that can be used to split two loads for unloading at two separate sites.

Another object of the invention is to protect the truck bed from the payload.

In addition, it is an object of the invention to provide an unloading system which is easily stored when not in use.

It is another object of the invention to provide an unloading system which can be easily interchanged on vehicles having the same vehicle bed dimensions.

It is a further object of the invention to provide an unloading system that is easily transported.

Moreover, it is an object of the invention to provide an unloading system that creates negligible weight gain to the vehicle.

Further, it is an object of the invention to provide an unloading system which is easily repaired.

Finally, it is an object of the invention to provide a method of dumping that does not hamper rear viewing.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein.

DESCRIPTION OF THE PREFERRED EMBODIMENT OF THE PRESENT INVENTION

While the invention is susceptible of embodiment in many different forms there is shown in the drawings and will be described herein in detail, preferred and alternate embodiments of the invention. It should be understood, however, that the present disclosure is to be considered an exemplification of the principles of the invention and is not intended to limit the spirit and scope of the invention and/or claims of the embodiments illustrated.

Figure 1:
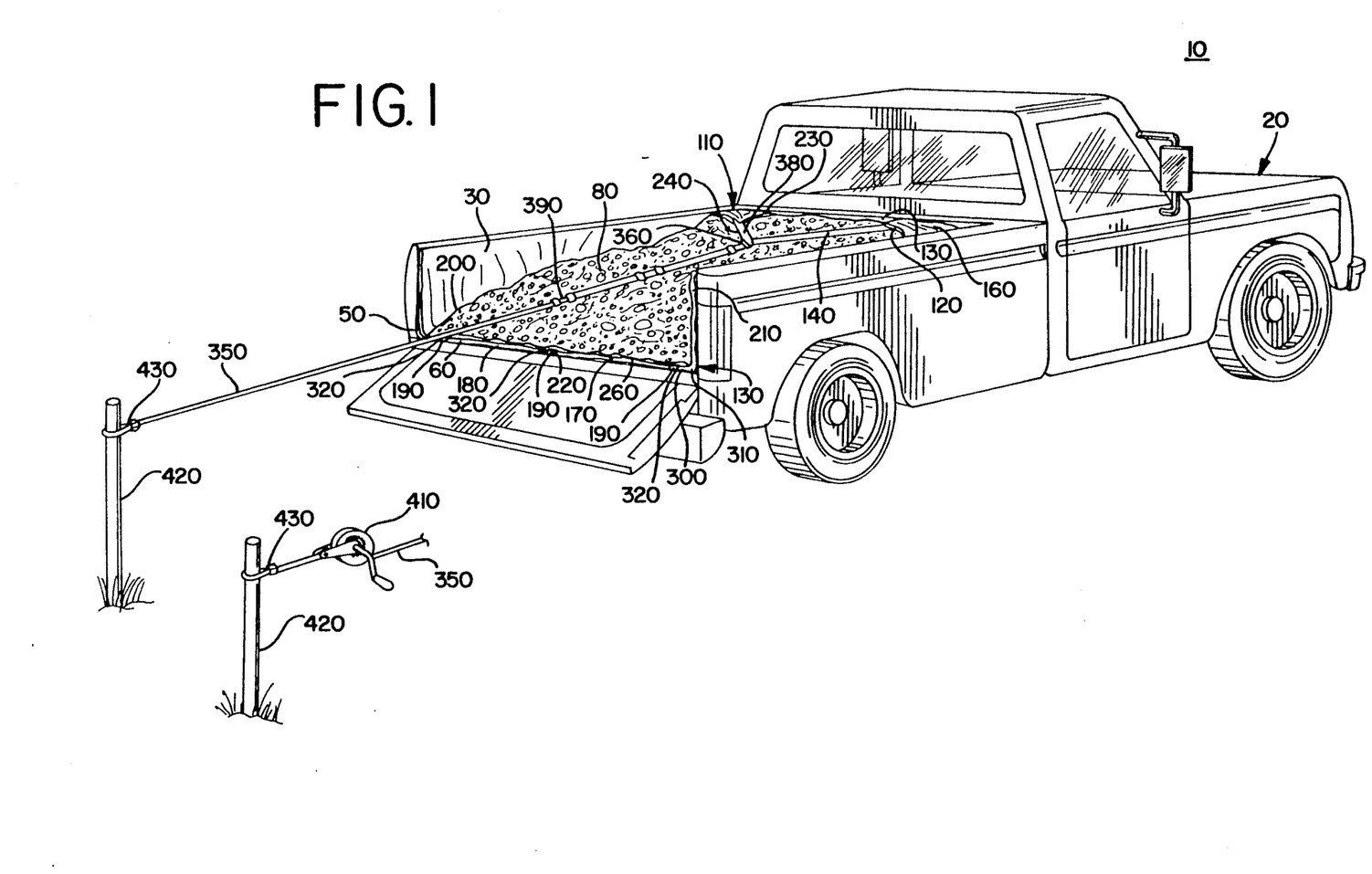
FIG. 1 is a perspective view of the preferred embodiment of the invention in position in a vehicle.

Referring now to the drawings, FIG. 1 shows the preferred embodiment of the invention 10, in vehicle 20. Invention 10 is in vehicle bed 30, resting on vehicle floor bed 50. Disposed on the invention 10 is payload 80. The payload 80 can be of any type of substance or material, whether granular, bagged, or loose. The vehicle 20 shown in FIG. 1 is a standard pickup truck, but vehicle 20 can be any type of vehicle that can carry a payload 80. The invention 10 consists of a tarpaulin assembly 110, a securing assembly 300, and a drawing assembly 380. Tarpaulin assembly 110 consists of first tarpaulin 120 having first end 130, with first sling 140, and back 160 First tarpaulin 120 also has a second end 170, with second end fold 180. Second end fold 180 has second end fold cut-outs 190. First tarpaulin 120 further has left side 200 and right side 210, and may, but need not have cosmetic end flap 215. Back 160, left side 200, right side 210 and cosmetic end flap 215 of first tarpaulin 120 protect the vehicle bed 30 from being damaged by payload 80.

In the preferred embodiment, second tarpaulin 220 rests on top of first tarpaulin 120. Second tarpaulin 220 has front end 230 with second sling 240. Second tarpaulin 220 also has rear end 260.

First tarpaulin 120 and second tarpaulin 220 can, but need not be constructed of 22 ounce Coverlite-VCN, which is a vinyl-coated woven nylon fabric, or another flexible sheet-like material such as cloth, canvas, plastic or rubber. First sling 140 and second sling 240 can, but need not be, constructed from one inch Yellow PD Nylon Web, rated at 9800 lbs/in, or any other sturdy cord type material, such as chain, rope, wire cable, etc.

Disposed on vehicle floor bed end 60 is securing assembly 300, consisting of rod fasteners 320 and trap rod 310. Inserted through rod fasteners 320 and second end fold cut-outs 190 is trap rod 310. Rod fastener 320 can be of a Z-shaped configuration (FIG. 10) or of a U-shaped configuration (FIG. 11). The trap rod 310 and rod fasteners 320 are likely to be constructed from metal, but could conceivably be constructed of other materials as well, such as plastic. As will be explained in greater detail below, the open-ended configuration of either the Z-shaped rod fastener 330 or the U-shaped rod fastener 340 allows the invention 10 to disengage from the vehicle 20 after the dumping cycle is complete.

In the preferred embodiment, rear end 260 of second tarpaulin 220 is not affixed to vehicle floor bed end 60 but floats freely.

Attached to first sling 140 and second sling 240 is the drawing assembly. Drawing assembly, which consists of drawing strap 350 is attached to first sling 140 and second sling 240 with spring clip 360. Drawing strap 350 can, but need not be, constructed from one inch Yellow PD Nylon Web, rated at 9800 lbs/in, or any other sturdy cord type material, such as chain, rope, wire cable, etc. Drawing strap 350 further has webbing slide 390 so that the length of drawing strap 350 can be adjusted. Drawing strap 350 further has fastening assembly 430 which may be connected to established anchorage 420. Established anchorage 420 may be a simple stake, as shown in FIG. 1, or may be another stationary object, such as a tree or a rock, or another vehicle. FIG. 1 also shows a winch 410, which may be connected to drawing strap 350 and established anchorage 420 at fastening assembly 430.

Figure 2:
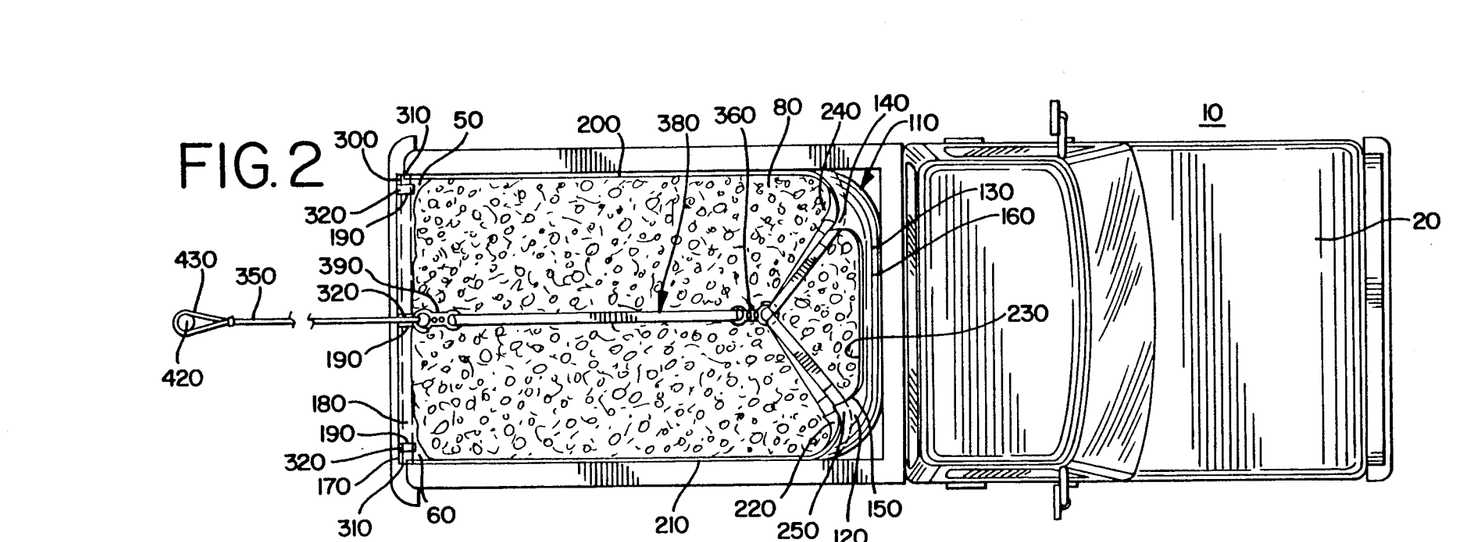
FIG. 2 is a top plan view of the preferred embodiment of the invention in a vehicle.

FIG. 2 shows a top plan view of the preferred embodiment of the invention 10. Invention 10 is in vehicle 20, resting on vehicle floor bed 50. Disposed on the invention 10 is payload 80. Invention 10 has tarpaulin assembly 110 having first tarpaulin 120 and second tarpaulin 220. First tarpaulin 120 consists of back 160, left side 200, and right side 210. First tarpaulin 120 also has first end 130, with first sling 140 in first sling sleeve 150. On second end 170, first tarpaulin 120 also has second end fold 180, second end fold 180 having second end fold cut-outs 190. Second tarpaulin 220 has front end 230, with second sling 240 in second sling sleeve 250. Not shown in FIG. 2 are left wheel well cut-out 270, and right wheel well cut-out 280 which may be required if vehicle 20 has wheel wells. (See FIG. 12).

Disposed on vehicle floor bed end 60 is securing assembly 300, rod fasteners 320 and trap rod 310. Rod fasteners 320 protrude through second end fold cut-outs 190. Extending through second end fold 180 and the protruding rod fasteners 320 is trap rod 310.

Attached to first sling 140 and second sling 240 is drawing assembly 380. Drawing assembly 380, which consists of drawing strap 350 is attached to first sling 140 and second sling 240 with spring clip 360. Drawing strap 350 further has webbing slide 390 so that the length of drawing strap 350 can be adjusted. Drawing strap 350 further has fastening assembly 430 which may be connected to established anchorage 420.

Figure 3:
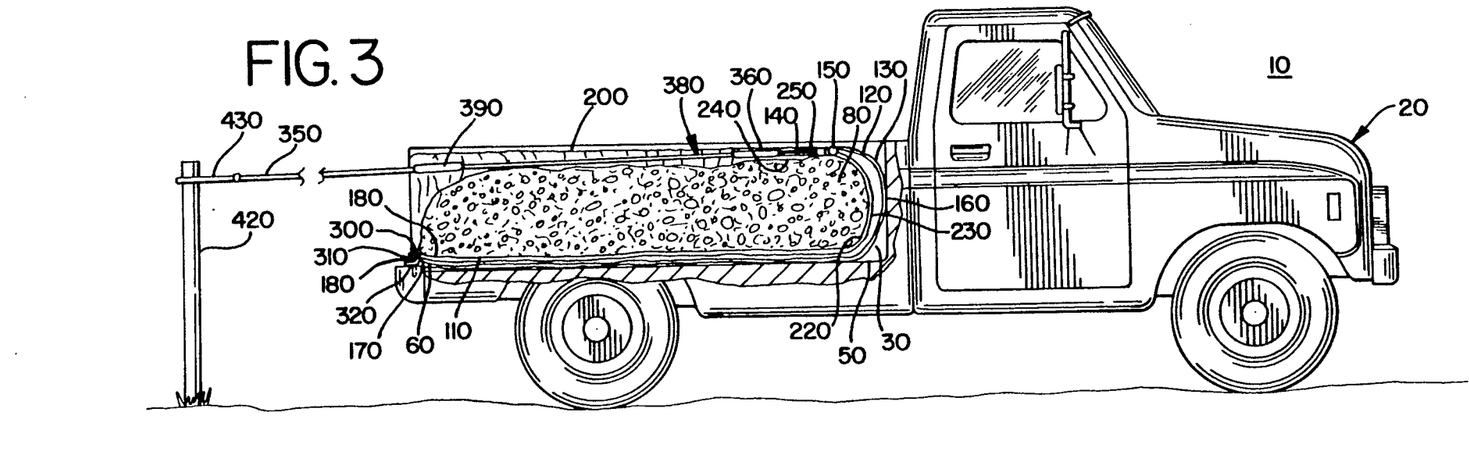
FIG. 3 is a side cut-away view of the preferred embodiment of the invention in a vehicle.

FIG. 3 is a side cut-away view of the preferred embodiment of the invention 10. Invention 10 is in vehicle 20, resting on vehicle bed 30, resting on vehicle floor bed 50. Disposed on the invention 10 is payload 80. Invention 10 has tarpaulin assembly 110 consisting of first tarpaulin 120 and second tarpaulin 220. First tarpaulin 120 consists of back 160, left side 200, and right side (not shown). First tarpaulin 120 also has first end 130, with first sling 140 in first sling sleeve 150. On second end 170, first tarpaulin 120 also has second end fold 180, second end fold 180 having second end fold cut-outs 190. Second tarpaulin 220 has front end 230, with second sling 240 in second sling sleeve 250. Not shown in FIG. 3 are left wheel well cut-out 270, and right wheel well cut-out 280. (See FIG. 12).

Disposed on vehicle floor bed end 60 is securing assembly 300 having rod fasteners 320 and trap rod 310. Rod fasteners 320 protrude through second end fold cut-outs 190. Extending through second end fold 180 and the protruding rod fasteners 320 is trap rod 310.

Attached to first sling 140 and second sling 240 is the drawing assembly 380. Drawing assembly 380, which consists of drawing strap 350 is attached to first sling 140 and second sling 240 with spring clip 360. Drawing strap 350 further has webbing slide 390 so that the length of drawing strap 350 can be adjusted. Drawing strap 350 further has fastening assembly 430 which may be connected to established anchorage 420.

Figure 4:
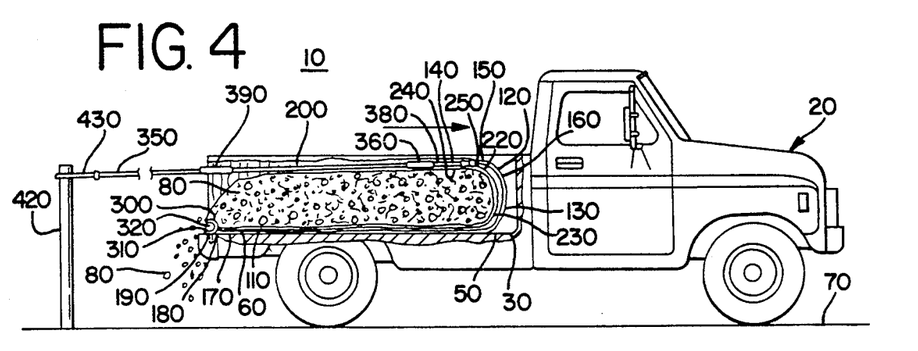
FIG. 4 is a side cut-away view of the preferred embodiment of the invention, showing the invention's position as the vehicle begins to pull away from the established anchorage.

FIG. 4 shows another side cut-away view of the preferred embodiment of the invention 10, showing vehicle 20 moving in a direction away from the established anchorage 420, with payload 80 being dumped onto the ground 70. Invention 10 is in vehicle 20, resting on vehicle bed 30, resting on vehicle floor bed 50. Disposed on the invention 10 is payload 80. Invention 10 has tarpaulin assembly 110 consisting of first tarpaulin 120 and second tarpaulin 220. First tarpaulin 120 consists of back 160, left side 200, and right side (not shown). First tarpaulin 120 also has first end 130, with first sling 140 in first sling sleeve 150. On second end 170, first tarpaulin 120 also has second end fold 180, second end fold 180 having second end fold cut-outs 190. Second tarpaulin 220 has front end 230, with second sling 240 in second sling sleeve 250. Not shown in FIG. 4 are left wheel well cut-out 270, and right wheel well cut-out 280. (See FIG. 12).

Disposed on vehicle floor bed end 60 is securing assembly 300 having rod fasteners 320 and trap rod 310. Rod fasteners 320 protrude through second end fold cut-outs 190. Extending through second end fold 180 and the protruding rod fasteners 320 is trap rod 310.

Attached to first sling 140 and second sling 240 is the drawing assembly 380. Drawing assembly 380, which consists of drawing strap 350 is attached to first sling 140 and second sling 240 with spring clip 360. Drawing strap 350 further has webbing slide 390 so that the length of drawing strap 350 can be adjusted. Drawing strap 350 further has fastening assembly 430 which may be connected to established anchorage 420.

Figure 5:
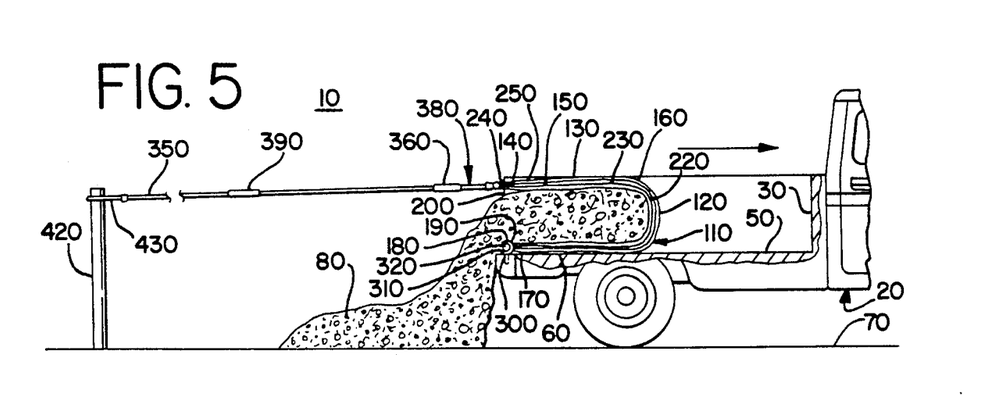
FIG. 5 is a side cut-away view of the preferred embodiment of the invention, showing the invention's position half way through the dumping cycle as the vehicle pulls away from the established anchorage.

FIG. 5 shows another side cut-away view of the preferred embodiment of the invention 10, showing vehicle 20 continuing to move in a direction away from the established anchorage 420, dumping additional payload 80 onto the ground 70. Invention 10 is in vehicle 20, resting on vehicle bed 30, resting on vehicle floor bed 50. Disposed on the invention 10 is payload 80. Invention 10 has tarpaulin assembly 110 consisting of first tarpaulin 120 and second tarpaulin 220. First tarpaulin 120 consists of back 160, left side 200, and right side (not shown). First tarpaulin 120 also has first end 130, with first sling 140 in first sling sleeve 150. On second end 170, first tarpaulin 120 also has second end fold 180, second end fold 180 having second end fold cut-outs 190. Second tarpaulin 220 has front end 230, with second sling 240 in second sling sleeve 250. Not shown in FIG. 5 are left wheel well cut-out 270, and right wheel well cut-out 280. (See FIG. 12).

Disposed on vehicle floor bed end 60 is securing assembly 300 having rod fasteners 320 and trap rod 310. Rod fasteners 320 protrude through second end fold cut-outs 190. Extending through second end fold 180 and the protruding rod fasteners 320 is trap rod 310.

Attached to first sling 140 and second sling 240 is the drawing assembly 380. Drawing assembly 380, which consists of drawing strap 350 is attached to first sling 140 and second sling 240 with spring clip 360. Drawing strap 350 further has webbing slide 390 so that the length of drawing strap 350 can be adjusted. Drawing strap 350 further has fastening assembly 430 which may be connected to established anchorage 420.

Figure 6:
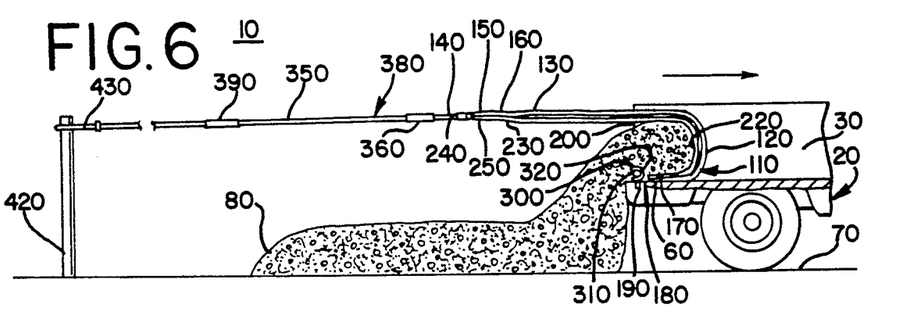
FIG. 6 is a side cut-away view of the preferred embodiment of the invention, showing the invention's position three quarters through the dumping cycle as the vehicle pulls away from the established anchorage.

FIG. 6 shows another side cut-away view of the preferred embodiment of the invention 10, showing vehicle 20 moving in a direction away from established anchorage 420. The invention 10 has nearly emptied the vehicle bed 30 of payload 80. Invention 10 is in vehicle 20, resting on vehicle bed 30, resting on vehicle floor bed 50. Disposed on the invention 10 and ground 70 is payload 80. Invention 10 has tarpaulin assembly 110 consisting of first tarpaulin 120 and second tarpaulin 220. First tarpaulin 120 consists of back 160, left side 200, and right side (not shown). First tarpaulin 120 also has first end 130, with first sling 140 in first sling sleeve 150. On second end 170, first tarpaulin 120 also has second end fold 180, second end fold 180 having second end fold cut-outs 190. Second tarpaulin 220 has front end 230, with second sling 240 in second sling sleeve 250. Not shown in FIG. 6 are left wheel well cut-out 270, and right wheel well cut-out 280. (See FIG. 12).

Disposed on vehicle floor bed end 60 is securing assembly 300 having rod fasteners 320 and trap rod 310. Rod fasteners 320 protrude through second end fold cut-outs 190. Extending through second end fold 180 and the protruding rod fasteners 320 is trap rod 310.

Attached to first sling 140 and second sling 240 is the drawing assembly 380. Drawing assembly 380, which consists of drawing strap 350 is attached to first sling 140 and second sling 240 with spring clip 360. Drawing strap 350 further has webbing slide 390 so that the length of drawing strap 350 can be adjusted. Drawing strap 350 further has fastening assembly 430 which may be connected to established anchorage 420.

Figure 7:
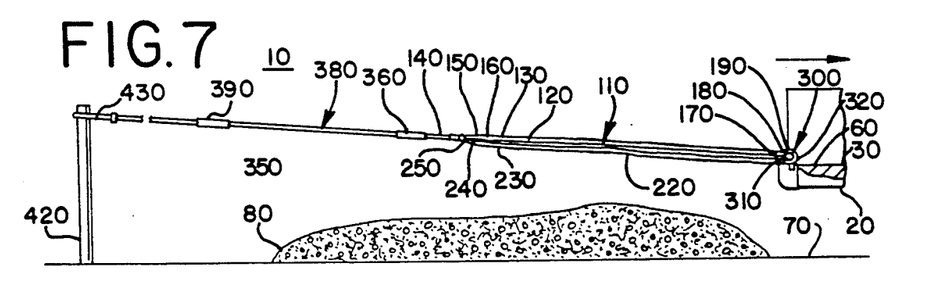
FIG. 7 is a side cut-away view of the preferred embodiment of the invention, showing the position of the invention after the dumping cycle is complete.

FIG. 7 shows another side cut-away view of the preferred embodiment of the invention 10, showing the payload 80 completely emptied from vehicle bed 30. Vehicle 20 continues in a direction away from established anchorage 420, and invention 10 is about to disengage from the vehicle 20. Invention 10 has tarpaulin assembly 110 consisting of first tarpaulin 120 and second tarpaulin 220. First tarpaulin 120 has back 160. First tarpaulin 120 also has first end 130, with first sling 140 in first sling sleeve 150. On second end 170, first tarpaulin 120 also has second end fold 180, second end fold 180 having second end fold cut-outs 190. Second tarpaulin 220 has front end 230, with second sling 240 in second sling sleeve 250. Not shown in FIG. 7 are left wheel well cut-out 270, and right wheel well cut-out 280. (See FIG. 12).

Disposed on vehicle floor bed end 60 is securing assembly 300 having rod fasteners 320 and trap rod 310. Rod fasteners 320 protrude through second end fold cut-outs 190. Extending through second end fold 180 and the protruding rod fasteners 320 is trap rod 310.

Attached to first sling 140 and second sling 240 is the drawing assembly 380. Drawing assembly 380, which consists of drawing strap 350 is attached to first sling 140 and second sling 240 with spring clip 360. Drawing strap 350 further has webbing slide 390 so that the length of drawing strap 350 can be adjusted. Drawing strap 350 further has fastening assembly 430 which may be connected to established anchorage 420.

Figure 8:
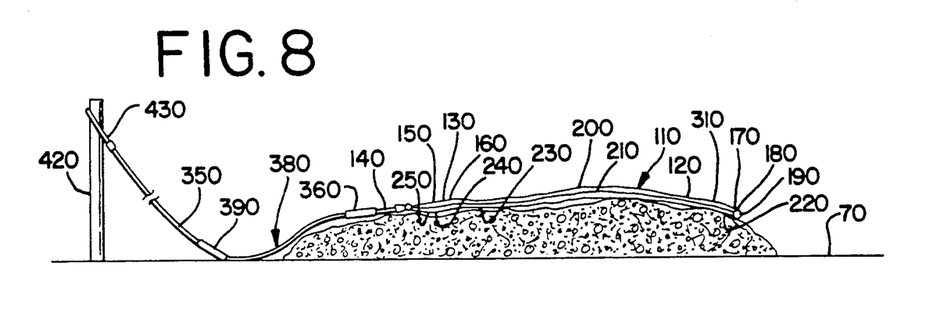
FIG. 8 is a side elevational view of the invention after the invention has disengaged from the vehicle.

FIG. 8 shows the preferred embodiment of the invention 10 after the invention 10 has disengaged from the vehicle 20. Invention 10 has tarpaulin assembly 110 consisting of first tarpaulin 120 and second tarpaulin 220. First tarpaulin 120 consists of back 160, left side 200, and right side (not shown). First tarpaulin 120 also has first end 130, with first sling 140 in first sling sleeve 150. On second end 170, first tarpaulin 120 also has second end fold 180, second end fold 180 having second end fold cut-outs 190. Second tarpaulin 220 has front end 230, with second sling 240 in second sling sleeve 250.

Attached to first sling 140 and second sling 240 is the drawing assembly 380. Drawing assembly 380, which consists of drawing strap 350 is attached to first sling 140 and second sling 240 with spring clip 360. Drawing strap 350 further has webbing slide 390 so that the length of drawing strap 350 can be adjusted. Drawing strap 350 further has fastening assembly 430 which may be connected to established anchorage 420. Also seen is trap rod 310.

Figure 9:
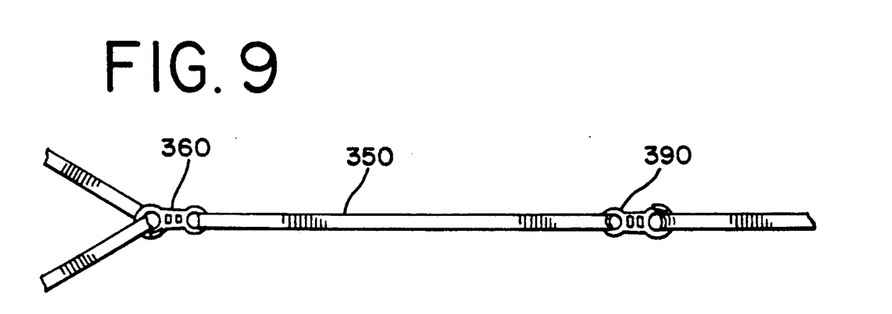
FIG. 9 is top plan view of the drawing strap.

FIG. 9 shows a detail of the drawing strap 350, consisting of spring clip 360, and webbing slide 390.

Figure 10:
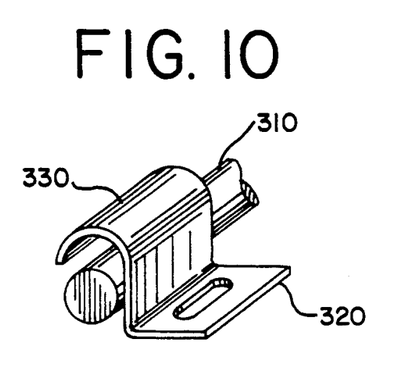
FIG. 10 is a detailed perspective view of the Z-shaped rod fastener.
Figure 11:
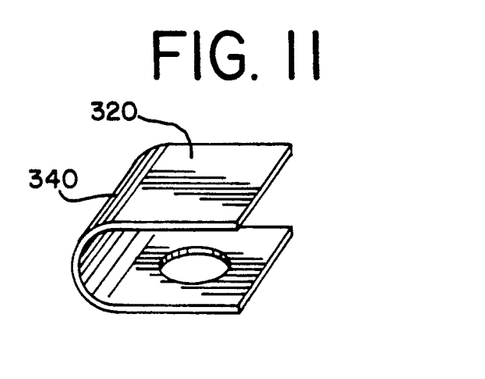
FIG. 11 is a detailed perspective view of the U-shaped rod fastener.

FIG. 10 is a detail of rod fastener 320 having a Z-shaped configuration 330 with trap rod 310.

FIG. 11 is a detail of rod fastener 320 having a U-shaped configuration 340.

Figure 12:
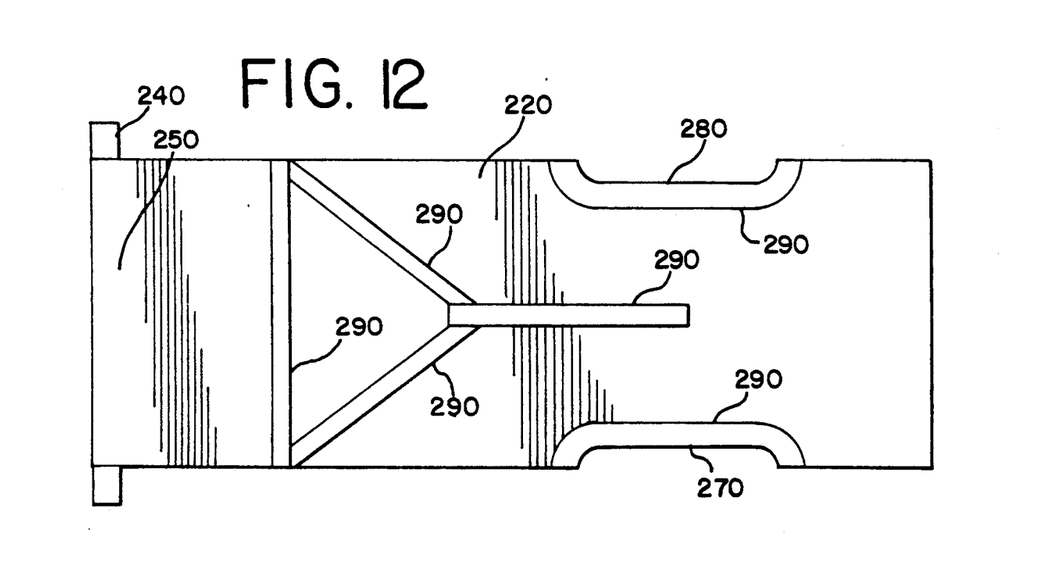
FIG. 12 is a top plan view of the second tarpaulin.

FIG. 12 shows a top view of second tarpaulin 220. Second tarpaulin 220 has left wheel well cut-out 270 and right wheel well cut-out 280. FIG. 12 further shows second sling 240 with second sling sleeve 250. Second tarpaulin 220 may, but need not have, reinforcing strips 290, which add strength to second tarpaulin 220.

Figure 13:
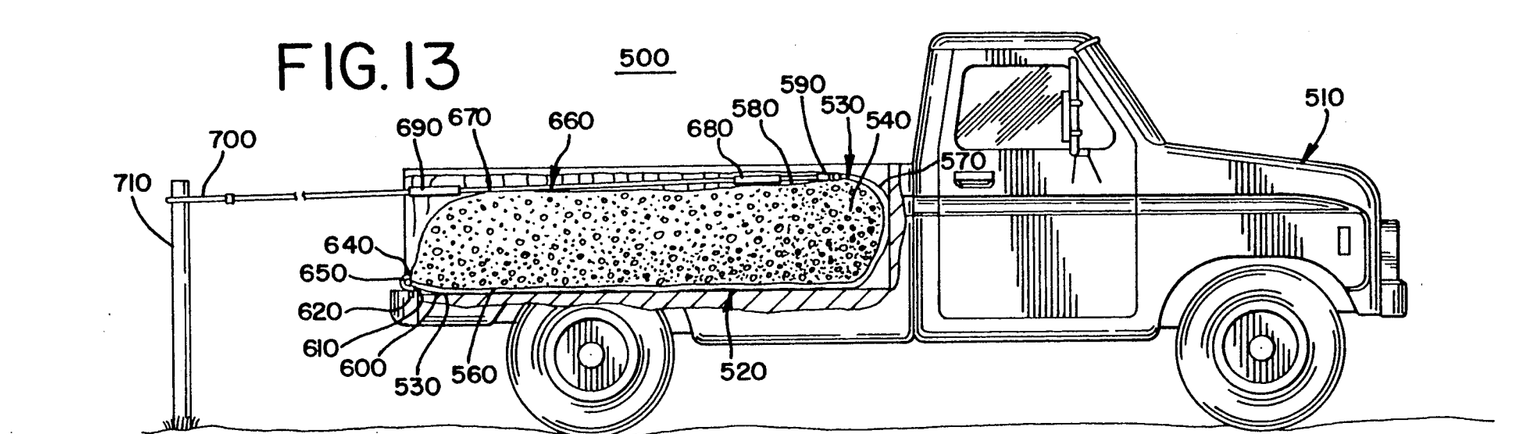
FIG. 13 is a side cut-away view of an alternate embodiment of the invention.

FIG. 13 shows a cut-away view of an alternate embodiment 500 of the invention 10. Alternate embodiment 500 is substantially the same as the preferred embodiment of the invention, except that alternate embodiment 500 does not use a second tarpaulin. Alternate embodiment 500 is in vehicle 510, resting on vehicle bed 520, resting on vehicle floor bed 530. Disposed on the alternate embodiment 500 is payload 540. Alternate embodiment 500 has tarpaulin assembly 550 consisting of first tarpaulin 560 having first end 570, with first sling 580 in first sling sleeve 590. On second end 600, first tarpaulin 560 also has second end fold 610, second end fold 610 having second end fold cut-outs 620. First tarpaulin 560 may also, but need not, have a back, left and right side (not shown).

Disposed on vehicle floor bed end 530 is securing assembly 630, having rod fasteners 640 and trap rod 650. Rod fasteners 640 protrude through second end fold cut-outs 620. Extending through second end fold 610 and the protruding rod fasteners is trap rod 650.

Attached to first sling 580 is drawing assembly 660. Drawing assembly 660, which consists of drawing strap 670 is attached to first sling 580 with spring clip 680. Drawing strap 670 further has webbing slide 690 so that the length of drawing strap 670 can be adjusted. Drawing strap further has fastening assembly 700 which may be connected to established anchorage 710.

Figure 14:
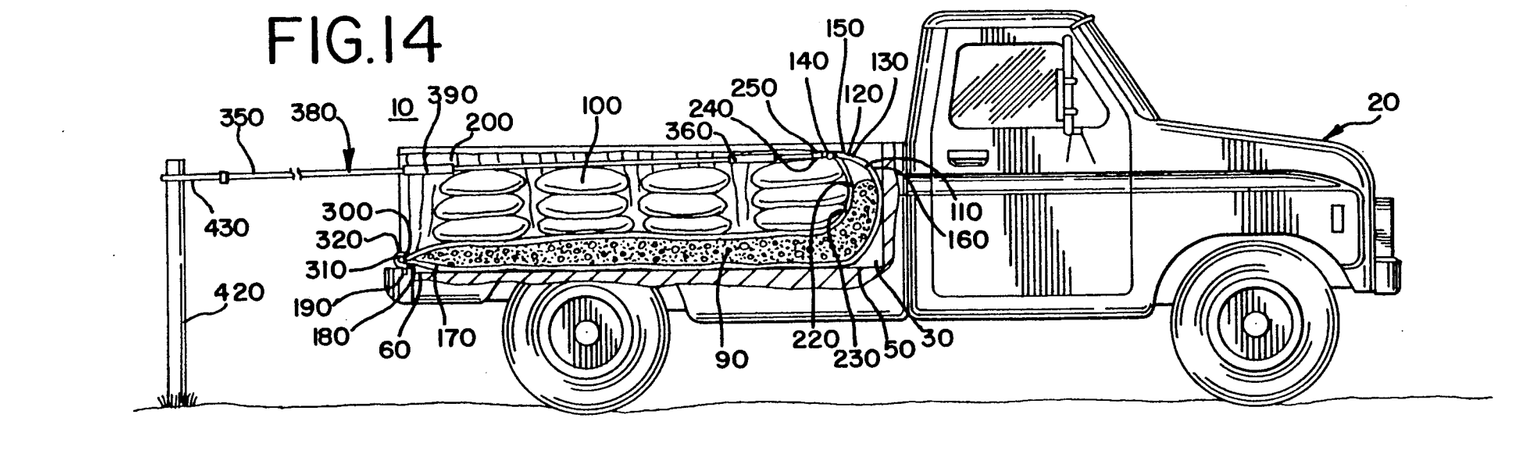
FIG. 14 is a side cut-away view of the preferred embodiment of the invention with two different payloads.

FIG. 14 is a cut-away view of the preferred embodiment of the invention 10 carrying two separate or different payloads. First payload 90 and second payload 100 can be any type of payloads, either identical or different, that need to be dumped in two different locations. Invention 10 is in vehicle 20, resting on vehicle bed 30, resting on vehicle floor bed 50. Invention 10 has tarpaulin assembly 110, consisting of first tarpaulin 120 and second tarpaulin 220. First tarpaulin 120 consists of back 160, left side 200, and right side (not shown). Disposed on the first tarpaulin 120 is first payload 90. First tarpaulin 120 also has first end 130, with first sling 140 in first sling sleeve 150. On second end 170, first tarpaulin 120 also has second end fold 180, second end fold 180 having second end fold cut-outs 190. Second tarpaulin 220 rests on top of first payload 90, and has front end 230, with second sling 240 in second sling sleeve 250. Second payload 100 rests on top of second tarpaulin 220. Not shown in FIG. 14 are left wheel well cut-out 270, and right wheel well cut-out 280. (See FIG. 12).

Disposed on vehicle floor bed end 60 is securing assembly 300 having rod fasteners 320 and trap rod 310. Trap rod 310 protrudes through second end fold cut-outs 190. Extending through second end fold 180 and the protruding rod fasteners 320 is trap rod 310.

Attached to first sling 140 and second sling 240 is drawing assembly 380. Drawing assembly 380, which consists of drawing strap 350 is attached to first sling 140 and second sling 240 with spring clip 360. Drawing strap 350 further has webbing slide 390 so that the length of drawing strap 350 can be adjusted. Drawing strap 350 further has fastening assembly 430 which may be connected to established anchorage 420.

To operate the preferred embodiment of the invention 10, invention 10, is placed in vehicle floor bed 50 as shown in FIG. 1. Trap rod 310, if not already in place, is slid into second end fold 180 of first tarpaulin 120, as can be seen in FIG. 2. Second end 170 of first tarpaulin 120 is positioned so that rod fasteners 320 protrude through second end fold cut-outs 190 and engage the trap rod 310. Payload 80 is loaded onto the invention 10, and the vehicle 20 then drives to the destination where the payload 80 is to be dumped. To dump the payload 80, vehicle 20 is positioned in the vicinity of where payload 80 is to be dropped. If the vehicle 20 has a door, then vehicle door 40 is lowered, and the drawing assembly 380 is attached to first sling 140 of first tarpaulin 120 and second sling 240 of second tarpaulin 220 at spring clip 360, as shown in FIG. 1. Fastening assembly 430 is then attached to established anchorage 420.

Vehicle 20 then slowly drives in a direction away from established anchorage 420 as shown in FIG. 4. Because drawing assembly 380 is firmly anchored at established anchorage 420 with fastening assembly 430, and the first end 130 of first tarpaulin 120 is anchored, the movement of the vehicle 20 causes the back 160 of invention 10 to exert a force against the payload 80, causing payload 80 to be dumped onto the ground 70 as the vehicle 20 moves in a direction away from established anchorage 420. First tarpaulin 120 and second tarpaulin 220 act in the same manner as a pulley system, reducing the actual force required to move the payload 80.

As vehicle 20 continues to move, additional payload 80 is dumped onto the ground 70 as seen in FIGS. 5 and 6. FIG. 7 shows the entire payload 80 discharged onto the ground 70, and the invention 10 about to disengage from the vehicle 20. Because the first end 130 of first tarpaulin 120 and front end 23 of second tarpaulin 220 have moved away from vehicle floor bed end 60, additional movement of the vehicle 20 will cause trap rod 310 to slide through the U or Z shaped rod fastener 320, disengaging the invention 10 from the vehicle 20. FIG. 8 shows the invention 10 resting on top of the discharged payload 80.

Operation of the alternate embodiment shown in FIG. 13 is substantially the same as the preferred embodiment of the invention. Alternate embodiment merely lacks the second tarpaulin, reducing the apparent mechanical advantage of the system.

FIG. 14 merely shows the invention 10 with two different payloads. Second payload 100 resting on second tarpaulin 220 may be dumped in the manner described above by merely attaching second sling 240 of second tarpaulin 220 to the drawing strap 350, and moving the vehicle 20 in a direction away from established anchorage 420. Vehicle 20 may then drive to a new location, and dump first payload 90 by attaching first tarpaulin 120 to drawing strap 350, and driving vehicle 20 in a direction away from established anchorage 420.

Finally, the system may be operated if vehicle 20 remains stationary. Drawing strap 350 can be attached to a winch 410, as shown in FIG. 1, or to a second vehicle (not shown). Drawing strap 350 is then collected on winch 410, or the second vehicle driven away, and the payload 80 is unloaded onto the ground 70.

The foregoing specification describes only the preferred embodiment and the alternate embodiments of the invention as shown. Other embodiments besides may be articulated as well. The terms and expressions therefore serve only to describe the invention by example only and not to limit the invention. It is expected that others will perceive differences which while differing from the foregoing, do not depart from the spirit and scope of the invention herein described and claimed.

We claim:

1. A device for unloading a payload from a vehicle, comprising:
   means for unloading the payload having first and second ends;
   means for securing said second end of said means for unloading to the vehicle;
   means for drawing said first end of said means for unloading in a direction toward said second end of said means for unloading, said drawing means positioned equal to or above a load supporting surface of the vehicle but no higher than an upper surface of the payload, causing the payload to be dumped from said means for unloading unhindered in the direction equal to the lowest surface of the payload.

2. The invention of claim 1, wherein said means for drawing has a drawing strap, said drawing strap having first and second ends, said first end of said drawing strap disposed on said first end of said tarpaulin assembly and said second end of said drawing strap connected to an established anchorage.

3. The invention of claim 2, wherein said means for drawing is movement of the vehicle away from said established anchorage.

4. The invention of claim 3, wherein said means of unloading has a first tarpaulin and a second tarpaulin, wherein said tarpaulins are activated by the same pulling motion.

5. The invention of claim 4, wherein said first tarpaulin has a back, left and right sides, and a cosmetic flap.

6. The invention of claim 5, wherein said means for securing is a trap rod disposed on said first tarpaulin, and a Z-shaped rod fastener disposed on the vehicle.

7. The invention of claim 5, wherein said means for securing is a trap rod disposed on said first tarpaulin, and a U-shaped rod fastener disposed on the vehicle.

8. The invention of claim 1, wherein said means for drawing has a drawing strap having first and second ends, said first end of said drawing strap disposed on said second end of said tarpaulin assembly, said second end of said drawing strap connected to a winch whereby said winch collects said drawing strap.

9. The invention of claim 8, wherein said means for unloading has a first tarpaulin and a second tarpaulin, wherein said tarpaulins are activated by the same pulling motion.

10. The invention of claim 9, wherein said first tarpaulin has a back, left and right sides, and a cosmetic end flap.

11. The invention of claim 10, wherein said means for securing is a trap rod disposed on said first tarpaulin, and a Z-shaped rod fastener disposed on the vehicle.

12. The invention of claim 10, wherein said means for securing is a trap rod disposed on said first tarpaulin, and a U-shaped rod fastener disposed on the vehicle.

13. A device for unloading a payload from a vehicle, comprising:
   means for unloading the payload having first and second ends, said means for unloading having a first tarpaulin and a second tarpaulin;
   means for securing said second end of said means for unloading to the vehicle;
   means for drawing said first end of said means for unloading in a direction toward said second end of said means for unloading, said drawing means positioned equal to or above a load supporting surface of the vehicle but no higher than an upper surface of the payload, causing the payload to be dumped from said means for unloading unhindered in the direction equal to the lowest surface of the payload.

14. The invention of claim 13, wherein said first tarpaulin has a back, left and right sides, and a cosmetic end flap.

15. The invention of claim 14, wherein said means for securing is a trap rod disposed on said first tarpaulin, and a Z-shaped rod fastener disposed on the vehicle.

16. The invention of claim 14, wherein said means for securing is a trap rod disposed on said first tarpaulin, and a U-shaped rod fastener disposed on the vehicle.

17. A device for unloading a payload from a vehicle, comprising:
   means for unloading the payload having first and second ends;
   means for securing said second end of said means for unloading to the vehicle;
   means for drawing said first end of said means for unloading in a direction toward said second end of said means for unloading, said means for drawing positioned equal to or above a load supporting surface of the vehicle but no higher than an upper surface of the payload, said means for drawing having a drawing strap, said drawing strap having first and second ends, said first end of said drawing strap connected to said first end of said means for unloading, said second end of said drawing strap connected to an established anchorage, whereby the movement of the vehicle away from said established anchorage causes the payload to be dumped from said means for unloading unhindered in the direction equal to the lowest surface of the payload.

18. The invention of claim 17, wherein said means for unloading comprises a tarpaulin assembly and said tarpaulin assembly has a first tarpaulin and a second tarpaulin.

19. The invention of claim 18, wherein said first tarpaulin has a back, and left and right sides.

20. The invention of claim 19, wherein said means for securing is a trap rod disposed on said first tarpaulin, and a Z-shaped rod fastener disposed on the vehicle.

21. The invention of claim 19, wherein said means for securing is a trap rod disposed on said first tarpaulin, and a U-shaped rod fastener disposed on the vehicle.

22. A method for unloading a vehicle, consisting of a means for unloading the payload having first and second ends, means for securing said second end to said vehicle, and a drawing strap having first and second ends, said drawing strap disposed on said first end of said means for unloading and said drawing strap positioned equal to or above a load supporting surface of the vehicle but no higher than an upper surface of the payload, comprising the steps of:

attaching said drawing strap to an established anchorage; and     moving the vehicle in a direction away from said established anchorage to unload said payload unhindered in the direction equal to the lowest surface of the payload.

23. A method for unloading a vehicle, consisting of means for unloading the payload having first and second ends, means for securing said second end to said vehicle, and a drawing strap having first and second ends, said drawing strap disposed on said first end of said means for unloading and said drawing strap positioned equal to or above a load supporting surface of the vehicle but no higher than an upper surface of the payload, comprising the steps of:

attaching said means for drawing to a winch; and collecting said drawing strap with said winch to unload said payload unhindered in the direction equal to the lowest surface of the payload.

* * * * *